Figure 1:
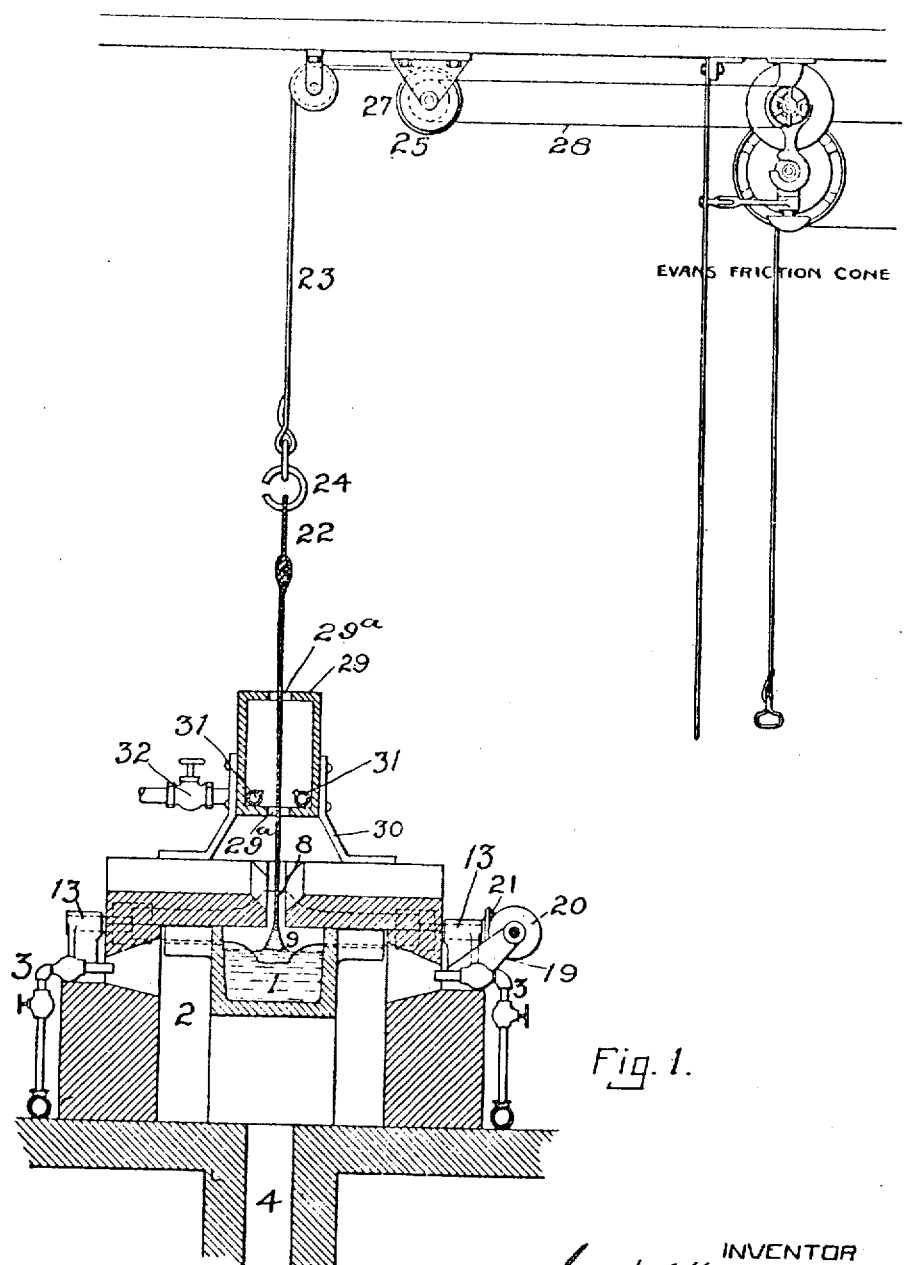

No. 840,433. PATENTED JAN. 1, 1907.
I. W. COLBURN.
METHOD AND APPARATUS FOR DRAWING SHEET GLASS.
APPLICATION FILED MAY 16, 1904.

4 SHEETS—SHEET 2.

WITNESSES
INVENTOR
ATTORNEYS

No. 840,433. PATENTED JAN. 1, 1907.
I. W. COLBURN.
METHOD AND APPARATUS FOR DRAWING SHEET GLASS.
APPLICATION FILED MAY 12, 1904.
4 SHEETS—SHEET 4.
Fig. 8.
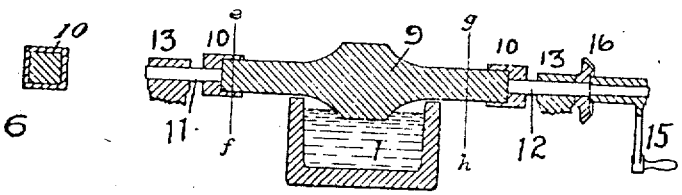 
Fig. 6. Fig. 5. Fig. 7.
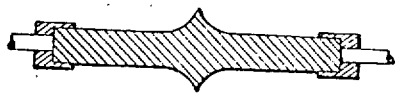
Fig. 9.
WITNESSES
INVENTOR
ATTORNEYS

UNITED STATES PATENT OFFICE.

IRVING W. COLBURN, OF FRANKLIN, PENNSYLVANIA.

METHOD AND APPARATUS FOR DRAWING SHEET-GLASS.

No. 840,433.　　　　Specification of Letters Patent.　　　　Patented Jan. 1, 1907.

Application filed May 18, 1904. Serial No. 208,570.

*To all whom it may concern:*

Be it known that I, IRVING W. COLBURN, a resident of Franklin, Pennsylvania, have invented a new and useful Improvement in Methods and Apparatus for Drawing Sheet-Glass, which invention is fully set forth in the following specification.

This invention relates to the art of glass-working, and more particularly to the art of drawing sheets of glass from a molten mass.

In my application Serial No. 178,912, filed October 28, 1903, I have disclosed an apparatus for drawing a sheet of glass from a mass of molten glass and after it has emerged from the furnace subjecting it to the action of rollers so disposed on the opposite faces of the sheet that they act to grasp the sheet of glass between them and roll it toward its edges, and thereby serve to stretch the sheet and overcome the tendency which sheets of glass have during the drawing operation to rapidly narrow and finally draw to a string or thread.

The present invention relates to a means and process for drawing sheets of glass whereby the sheets may be drawn of uniform width and the tendency of the glass to narrow and draw to a string or thread may be obviated without the necessity of stretching the sheet or of grasping it between oppositely-disposed rollers in the manner described in my application before mentioned.

The objects of the invention, generally stated, are to provide an apparatus and process whereby a sheet of glass of any desired thickness within fixed limits and of uniform width may be drawn and whereby a sheet may be produced having a smooth and brilliant surface free from waves or flaws, which would injure the marketable quality of the product.

With these objects in view, the invention resides in the process of forming a sheet of glass from a mass of molten glass, which consists in drawing a sheet from said mass in an upward direction and simultaneously drawing the molten glass to form the edges of said sheet from the mass of molten glass outward or away from the central line of the sheet as the same is drawn in a vertical direction. The general outward direction of the plastic glass as it is drawn to form the edges of the sheet may take place along any outwardly and upwardly inclined line. Moreover, it has been found that when drawing a sheet of glass the sheet is liable to crack or check during the drawing operation unless the sheet is kept sufficiently hot after it has become set, and for this reason the invention provides the additional step of imparting heat to the sheet of glass after it has emerged from the molten glass and has been drawn of the desired width and thickness, to the end that the entire sheet may be completed before the first portions drawn have been cooled to a degree where cracking is liable to occur.

The invention also consists in means for drawing the sheet in a longitudinal direction from the mass of molten glass combined with means engaging the plastic or molten glass in the pot near the edges of the sheet and drawing it in an upward and lateral direction. These upwardly and laterally drawing means may take various forms. Preferably they are in the form of horizontal rollers whose axes of rotation are at right angles to the longitudinal movement of the plane of the glass, the periphery of the rollers entering the surface of the plastic mass in the working pot and the revolution of the rollers being upward and outward from the medial line of the sheet, the two rollers therefore revolving in reverse directions. These rollers may be variously situated without departing from the invention, it only being necessary to so locate them that they shall act to give an upward and outward movement to the portion of molten glass that is to form the edge portion of the sheet; but for most uses, however, the position wherein the rollers are within the working pot and low enough down to have the lower sides of their peripheries immersed in the mass of molten glass is preferred. These laterally and upwardly drawing rollers may assume a great variety of forms, as that of a cylinder having a plain surface or a cylinder having a peripheral groove at the point where the plastic glass which is to form the edge of the sheet of glass is engaged thereby, or instead of a groove the roller may have a peripheral ridge running around it at the point where the plastic glass which is to form the edge of the sheet is engaged thereby. These examples of various forms which may be given to the roller illustrate the fact that the invention is not limited to a particular form or forms of roller, as many other forms than those described will readily suggest themselves to those skilled in the art.

The invention also consists in a working chamber or pot containing a mass of molten glass and having a plurality of filling or glassreceiving conduits or openings combined with means for drawing a sheet of glass from the mass between said conduits or openings and lateral means for drawing the sheet, which lateral drawing means are also located between the two filling conduits or openings of the working chamber or pot. The advantage of this construction lies in the fact that as additional glass is supplied to the working chamber or pot through these conduit-openings the hottest glass will be at the sides, whereas the cooler glass will be at the central portion of the sheet as drawn, thereby greatly facilitating the successful production of a sheet of glass of even width and thickness. The hot glass may be ladled into the working pot through filling-in openings or may be conducted to the working pot by conduits leading from the refining or other heating furnace, the essential being that the hot glass shall be directed to the points from which the edge portions of the sheet are drawn.

The invention also consists in providing a working chamber or pot containing the mass of molten glass combined with means for drawing the sheet both longitudinally and laterally therefrom, said working chamber or pot being provided with a top closure having a slot or opening through which the sheet is drawn, which top is depressed in the center or along the middle part of the slot, so as to bring the cover down much closer to the surface of the mass of molten glass in the working pot than it is at the points where the edges of the sheet pass therethrough. The result of this is that the drawn sheet is exposed to the cooling influence of the atmosphere at the center sooner than it is at the edges, thereby leaving the edges in a plastic condition longer than the center, to the end that the lateral drawing means may have more time to effectively perform their function.

The invention, furthermore, consists, in combination with the aforementioned elements, means for supplying heat to the sheet of glass after it has been withdrawn from the molten mass in the working pot and become set or partially set, to the end that the sheet may maintain a sufficiently high temperature during the operation of drawing, and thereby avoid the tendency of the sheet to crack or check by the cooling influence of the atmosphere as it is drawn outward from the working pot.

Another important feature of the invention consists of independent means for operating the longitudinally-drawing and the laterally-drawing devices, to the end that the two sets of devices may be each actuated at variable speeds, so that the workman may adjust the operation of the two devices to suit the conditions of the molten glass in the working pot and the character of sheet to be drawn.

The invention finally consists in the combination of devices and details of construction which will be hereinafter more specifically described, and then pointed out in the claims.

The inventive idea involved in the above-mentioned process may receive various expressions without losing its identity, and a variety of forms of apparatus may be employed in practicing the process. Moreover, the inventive idea of means and devices constituting the mechanical part of the invention may receive various mechanical expressions, one of which is shown in the accompanying drawings for the purpose of illustrating the invention. Said drawings, however, are for the purpose of illustration only and not for the purpose of defining the limits or scope of the invention.

Figure 3:
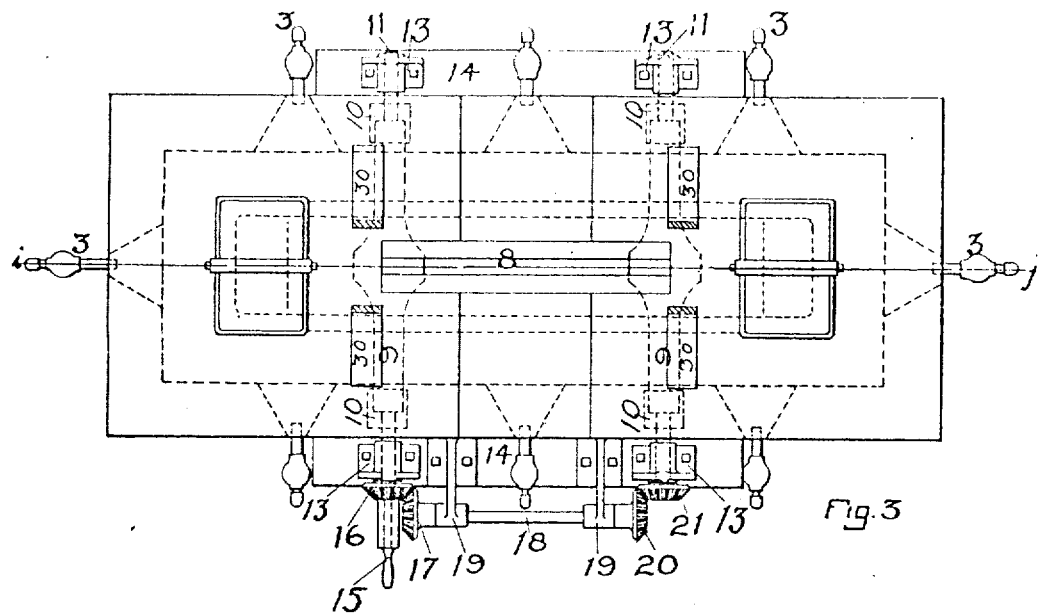
Figure 2:
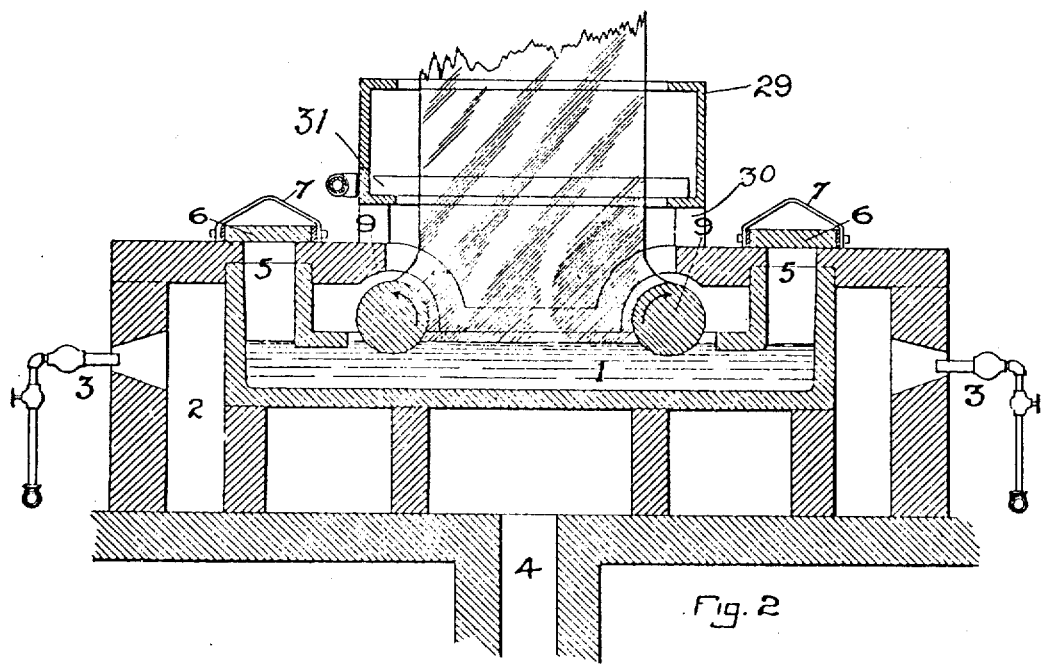
Figure 4:
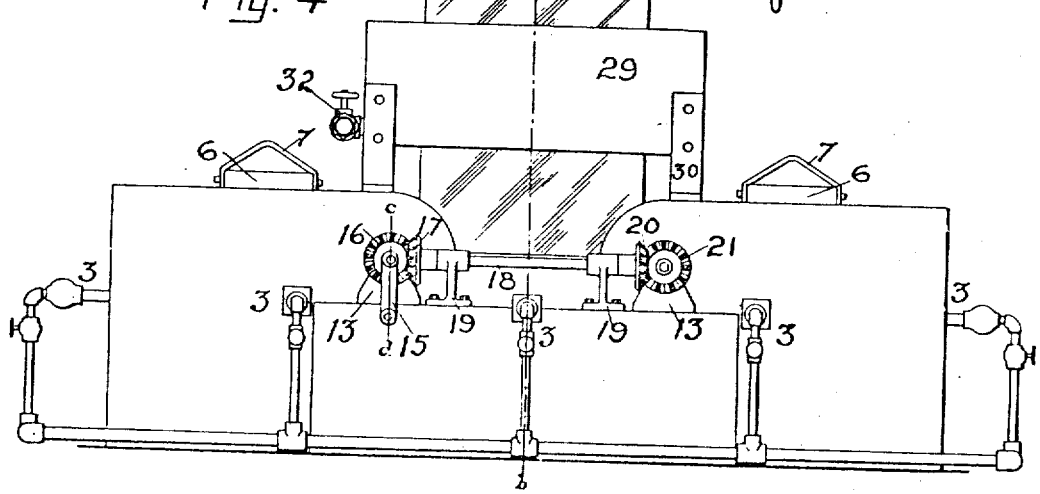

In said drawings, Figure 1 is a vertical section on the line $ab$, Fig. 4, with parts shown in elevation. Fig. 2 is a transverse central section on the line $ij$, Fig. 3. Fig. 3 is a top section on the line $ij$, Fig. 3. Fig. 3 is a top plan view with the heating-box removed, and Fig. 4 is a front elevation. Fig. 5 is a sectional detail of one of the rollers and associated parts, the section being taken on the line $cd$ of Fig. 4. Fig. 6 is a section on the line $ef$, Fig. 5. Fig. 7 is a section on the line $gh$, Fig. 5. Figs. 8 and 9 are sectional details illustrating a modified form of lateral drawing-rollers.

Referring to the drawings, in which like numerals indicate like parts, 1 is a working pot of any usual or suitable construction surrounded by a suitable furnace or fire-box 2, to which heat is supplied in any suitable way, as by burners 3 3, the products of combustion being carried off by a suitable flue, as 4. The working pot 1 and the fire-box 2, as here shown, are closed at the top, the working pot, however, being provided with a plurality of filling-openings 5 5, here shown as two in number, which filling-openings consist of holes through the cover of the working pot, which holes register with upwardly-projecting necks or conduits situated at each end of the pot. Any suitable cover 6, supplied with a bail 7 for facilitating the handling thereof, is provided to close the filling-openings 5. The cover or top to the working pot has an opening or narrow slot 8 formed therein, through which the sheet of glass is drawn. The cover, as here shown, is depressed along the greater or central portion of the slot 8, so as to approach very near to the surface of the molten glass within the working pot, while along each end of the slot the cover rapidly rises, preferably in an arc-like form, so that the edges of the glass pass through the slot at a point much higher up from the surface of the molten glass in the pot than does the central portion of the sheet.

Located within the working-chamber or pot and immediately under the arc-shaped portions of the cover thereto are two rollers 9 9, whose axes of rotation preferably extend at right angles to the surface of the sheet of glass as it is drawn through the slot. These rollers are located in such a position that the peripheries thereof engage the molten mass and draw upwardly and outwardly the glass to form the edges of the sheet. Preferably the peripheries of the rollers are so located that they lie slightly within the lateral edges of the sheet, though this is not essential. As here shown, these rollers 9 9 are so located that their peripheries are immersed to a greater or less extent within the mass of molten glass in the working pot. As before mentioned, the rollers may be of various forms—such, for example, as shown in Figs. 5, 8, or 9—though the construction shown in Fig. 2 is preferred. The rollers may be mounted in any suitable way and provided with any suitable mechanism for driving the same. As here shown, the ends of the rollers are polygonal in form to engage corresponding sockets 10, Figs. 5 and 6, which sockets are integral with or otherwise rigidly secured to shafts 11 and 12, turning in bearings 13, mounted on the framework of the machine—as, for example, on the piers 14, Fig. 3. One of the shafts 12 has secured rigidly thereto a crank 15, by which it is revolved, and also has keyed thereto a bevel-gear 16, engaging a corresponding gear 17 Fig. 3, on shaft 18, revolving in bearings 19 19, also secured to the pier 14. On the opposite end of the shaft 18 is a bevel-gear 20, engaging a bevel-gear 21 upon the shaft of the other laterally-drawing roller 9. By revolving the crank 15 it will be seen that the rollers 9 9 will be revolved in opposite directions, either inward and downward toward each other, or upward and outward from each other.

Referring to Figs. 1 and 4, 22 is the bait, which may be of any suitable construction, which bait is secured to the flexible cables 23 by any suitable means, as by open rings 24 24, the cables being wound around a drum 25 on shaft 26, which shaft turns in bearings 27, supported above the machine, and is driven by the driving-belt 28, Fig. 1, running to any suitable source of power, preferably to an Evans friction-cone device, by means of which a variable speed may be imparted to the drum, to the end that the sheet of glass may be drawn more or less rapidly, as the exigencies of the operation may require. Referring to Figs. 1 and 4, 29 is a heating apparatus for heating the opposite faces of the sheet of glass after it has emerged from the slot 8 in the cover of the working pot. As here shown, this apparatus is in the form of a box having slots 29ª through its top and bottom and supported upon suitable brackets or standards 30 30, resting on top of the furnace. Heat is supplied to the fire-box by burners 31 31, placed on opposite sides thereof and preferably within the lower portion, the fuel-supply being regulated by a suitable valve 32.

Operation: The molten or plastic glass in the pot 1 being brought to the proper heat and working condition and the bait 22 having been previously prepared so that the plastic glass will adhere to it, it is lowered, by means of the cables 23 and the drum 25, through the fire-box and the slot 8 in the top of the working pot and is allowed to stand in the molten mass until the glass has adhered firmly to it. The burners 31 in the fire-box 29 being lighted, the bait is then started upward by means of the drum driven by the friction-cone, and simultaneously with the upward movement of the bait the rollers 9 9 are started to revolve in an upward and outward direction—i. e., in the direction indicated by the arrows on Fig. 2—the revolution of these rollers being continued in the directions indicated during the entire operation of drawing the sheet. As the bait is drawn upward the plastic glass at the lower end of the sheet will adhere to the rollers 9 9 and will be drawn outward therewith in the manner indicated in Fig. 2, thereby initially drawing the sheet of a uniform width without the necessity of stretching it after it is drawn. Immediately after the central portion of the sheet is drawn it emerges from the slot 8 and is subjected to the cooling influence of the atmosphere, which is sufficient to set the same, while the edges which are in contact with the rollers 9 9 remain within the hot working-pot a little longer, and immediately after these edges have been drawn outward to the desired point by the rollers they, too, pass through the slot 8 at a point higher up than the point where the central portion of the sheet passed through the slot and are likewise subjected to the cooling influence of the atmosphere during the traverse of the sheet from the slot 8 to the lower portion of the fire-box 29. During the passage of the sheet through the fire-box sufficient heat is imparted thereto to insure it against liability to crack or check during the further operation. This application of heat to the surface of the glass is not to be confused with the process of fire-finishing glass as heretofore practiced, as there is no need to fire-finish glass drawn by the process herein described, the surface being of a perfectly smooth and brilliant character and presenting a beautiful luster. The sole purpose of the fire-box 29 is to aid in retaining or adding to the heat that is still in the glass after it has been drawn, and thus avoid the cracking of the glass during the drawing operation. The sheet of glass having been drawn to the desired length, the direction of rotation of the rollers 9 9 is reversed, while the bait continues to move upward, thus causing the sheet of glass to quickly draw to a cord or thread, which can be easily severed with a cold iron or cut off with shears. This manner of severing the sheet leaves the glass in the working pot in excellent condition for drawing another sheet. The lower end of the sheet of glass being detached from the mass of molten glass in the working pot, the sheet is raised high enough to clear the parts of the machine and is then swung to one side and lowered into a horizontal or other position on suitable supports for removal. The bait is then cracked off by any of the well-known means employed in the art, and the sheet is ready for the usual process of annealing or other treatment. The operation may be repeated by attaching a second bait to the flexible cables 23 and proceeding as before.

It will be observed that the sheet of glass is produced of full width by a drawing action only and that once it emerges in sheet form from the mass of molten glass in the pot (being drawn by the movements of the bait and rollers) it retains its width without the necessity of any stretching between compression-rollers or otherwise. This is important, since it avoids the marring of the surface of the sheet by contact with stretching-rollers, thus leaving the surface of the entire sheet of the same brilliancy as when drawn. By the term "drawing" as used in the specification and claims herein is meant the act of pulling glass out of the conglomerate molten mass by the continuous movement away from said mass of the part already pulled.

While, as heretofore stated, the rolls 9 9 act as drawing means for drawing the glass from the molten mass to form the edge portions of the sheet, and thus maintain it to its full width without the necessity of any stretching action, such rolls nevertheless have, in addition to this drawing function, the function of imparting a more or less lateral or stretching strain to the sheet, as will readily be perceived by studying the action of the rolls as illustrated in Fig. 2, so that said rolls constitute means for drawing the mass of molten glass to form the side portions of the sheet and simultaneously stretching the sheet laterally, and this is accomplished without any portion of the mechanism coming in physical contact with the faces of the sheet at the edge portions or otherwise, and therefore without marring the fine fire-finish due to the drawing action.

What is claimed is—

1. The method of forming a sheet of glass, which consists in preparing a mass of molten glass, and drawing the glass therefrom in sheet form, the drawing force being simultaneously applied in the directions of the sheet's length and width.

2. The method of forming a sheet of glass, which consists in preparing a mass of molten glass, and drawing the glass therefrom in sheet form, the drawing force being simultaneously applied in the direction of the sheet's length and in the directions of its two edges.

3. The method of forming a sheet of glass, which consists in preparing a mass of molten glass, and drawing the glass therefrom in sheet form, the drawing force being simultaneously applied in a vertical direction and transversely of the sheet.

4. The method of forming a sheet of glass, which consists in preparing a mass of molten glass, and drawing the glass therefrom in sheet form, the drawing force being simultaneously applied in the direction of the top and edges of the sheet.

5. The method of forming a sheet of glass which consists in preparing a mass of molten glass, drawing the molten glass in the direction of the sheet's length to form the middle portion of the sheet, and simultaneously drawing molten glass in the direction of the sheet's edges to form the edge portions of the sheet.

6. The method of forming a sheet of glass, which consists in preparing a mass of molten glass, and drawing the glass therefrom in sheet form, the drawing force being simultaneously applied in the directions of the sheet's length and width, and subjecting the sheet to the action of heat during the continuance of the drawing operation.

7. The method of forming a sheet of glass, which consists in preparing a mass of molten glass, and drawing the glass therefrom in sheet form, the drawing force being simultaneously applied in the direction of the sheet's length and in the directions of its two edges, and subjecting the sheet to the action of heat during the continuance of the drawing operation.

8. The method of forming a sheet of glass, which consists in preparing a mass of molten glass, and drawing the glass therefrom in sheet form, the drawing force being simultaneously applied in a vertical direction and transversely of the sheet, and subjecting the sheet to the action of heat during the continuance of the drawing operation.

9. The method of forming a sheet of glass, which consists in preparing a mass of molten glass, and drawing the glass therefrom in sheet form, the drawing force being simultaneously applied in the direction of the top and edges of the sheet, and subjecting the sheet to the action of heat during the continuance of the drawing operation.

10. The method of forming a sheet of glass, which consists in preparing a mass of molten glass, continuously drawing a sheet of glass therefrom in the direction of the sheet's length, and continuously drawing the molten glass in the direction of the sheet's edges.

11. The method of forming a sheet of glass, which consists in preparing a mass of molten glass, continuously drawing a sheet of glass therefrom in the direction of the sheet's length and also in the direction of its edges while maintaining the heat in the drawn sheet high enough to prevent cracking during the drawing operation.

12. In an apparatus for drawing sheet-glass, the combination of a receptacle for molten glass, a bait for drawing the glass in sheet form therefrom, and revolving means counteracting the tendency of the sheet to narrow and draw to a rod or thread.

13. In an apparatus for drawing sheet-glass, the combination of a receptacle for molten glass, a bait for drawing the glass in sheet form therefrom, and means also drawing molten glass from said receptacle in the direction of the edges of the sheet, whereby said bait and said means draw a sheet of uniform width.

14. In an apparatus for drawing sheet-glass, the combination of a receptacle for molten glass, a bait for drawing the glass in sheet form therefrom, and upwardly and outwardly drawing means adjacent to the ends of the bait when the latter is in place in the molten glass.

15. In an apparatus for drawing sheet-glass, the combination of a receptacle for molten glass, a bait, and means moving the bait away from said receptacle to draw a sheet, with a plurality of drawing devices acting to draw glass from said receptacle outward from the edges of the sheet drawn by the bait.

16. In an apparatus for drawing sheet-glass, the combination with a receptacle for molten glass, a bait, and means withdrawing said bait from said receptacle to form a sheet, of drawing devices located one adjacent to each edge of the sheet and serving to draw molten glass from said receptacle to form the edge portions of the sheet.

17. In an apparatus for drawing sheet-glass, the combination with a receptacle for molten glass, a bait, and means withdrawing said bait from said receptacle to form a sheet, of two drawing devices located one adjacent to each edge of the sheet at its bottom and serving to draw molten glass from said receptacle to form the edge portions of the sheet.

18. In an apparatus for drawing sheet-glass, the combination with a receptacle for molten glass, a bait, and means withdrawing said bait from said receptacle to form a sheet, of two drawing devices located one adjacent to each edge of the sheet and engaging the molten glass in said receptacle and serving to draw the glass therefrom to form the edge portions of the sheet.

19. In an apparatus for drawing sheet-glass, the combination with a receptacle for molten glass, a bait and means withdrawing said bait from said receptacle to form a sheet, of two revoluble bodies located one adjacent to each edge of the sheet at its bottom and means revolving said bodies in opposite directions.

20. In an apparatus for drawing sheet-glass, the combination with a receptacle for molten glass, a bait and means withdrawing said bait from said receptacle to form a sheet, of two revoluble bodies located one adjacent to each edge of the sheet at its bottom and engaging the glass in said receptacle, and means revolving said bodies in opposite directions.

21. In an apparatus for drawing sheet-glass, the combination of a receptacle for molten glass, a bait, and means withdrawing said bait from the receptacle to form a sheet, of two rollers located one adjacent to each edge of the sheet near its bottom, and means revolving said rollers in opposite directions.

22. In an apparatus for drawing sheet-glass, the combination of a receptacle for molten glass, a bait, and means withdrawing said bait from the receptacle to form a sheet, of two rollers located one adjacent to each edge of the sheet near its bottom and having axes transverse to the plane of the sheet drawn by the bait, and means revolving said rollers in opposite directions.

23. In an apparatus for drawing sheet-glass, the combination with a receptacle containing molten glass, a bait, and means withdrawing the bait from the receptacle to form a sheet, of two rollers revoluble on axes transverse to the sheet, the lower part of the peripheries of said rollers being immersed in the molten glass adjacent to the edges of the sheet being drawn, and means revolving said rollers in opposite directions.

24. In an apparatus for drawing sheet-glass, the combination with a receptacle containing molten glass, a bait, means withdrawing said bait from the receptacle to form a sheet of glass, and filling or supply conduits or openings for the entrance of molten glass into said receptacle adjacent to the edges of the sheet being drawn.

25. In an apparatus for drawing sheet-glass, the combination with a receptacle containing molten glass, a bait, means withdrawing said bait from the receptacle to form a sheet of glass, means counteracting the tendency of the sheet to narrow during drawing operation, and filling or supply conduits or openings for molten glass into said receptacle adjacent to the edges of the sheet being drawn.

26. In an apparatus for drawing sheet-glass, the combination with a receptacle containing molten glass and having two filling or supply conduits or openings, of a bait interposable in the glass in said receptacle between said conduits or openings, and means withdrawing the bait from the receptacle to form a sheet of glass.

27. In an apparatus for drawing sheet-glass, the combination with a receptacle, containing molten glass, of a bait, means withdrawing said bait from the receptacle to form a sheet, rollers revoluble on axes transverse to the plane of said sheet, means revolving said rollers in opposite directions, and two filling or supply conduits or openings entering the receptacle one adjacent to each roller.

28. In an apparatus for drawing sheet-glass, the combination with a receptacle containing molten glass, of means for drawing a sheet of glass therefrom, revolving means maintaining the sheet of uniform width and a heating device for supplying heat to the drawn sheet adjacent to said receptacle.

29. In an apparatus for drawing sheet-glass, the combination with a receptacle containing molten glass, of means for drawing glass from said receptacle in sheet form longitudinally of the sheet, devices drawing the glass from the receptacle in the direction of the edges of the sheet, and independent operating mechanisms for said means and devices.

30. In an apparatus for drawing sheet-glass, the combination with a receptacle containing molten glass, of a bait for drawing a sheet of glass from said receptacle, means also drawing glass from the receptacle to form the edge portions of the sheet, and independent operating mechanism for said bait and means, said mechanisms being capable of operation at variable speeds.

31. In an apparatus for drawing sheet-glass, the combination of a receptacle containing molten glass, a cover for said receptacle having a depressed central portion and elevated end portions, and a slot extending across said depressed portion and into said elevated end portions.

32. In an apparatus for drawing sheet-glass, the combination of a receptacle containing molten glass, means for drawing a sheet of glass therefrom, and means drawing the glass to form the edge portions of the sheet whereby it is held to uniform width.

33. In an apparatus for drawing sheet-glass, a receptacle containing molten glass, means for drawing glass therefrom in sheet form in a longitudinal direction, and means simultaneously drawing and stretching the glass laterally.

34. In an apparatus for drawing sheet-glass, a receptacle containing molten glass, means for drawing glass therefrom in sheet form in a longitudinal direction, and a plurality of surfaces drawing glass from said receptacle to form the side portions of the sheet and simultaneously stretching the sheet laterally.

35. In an apparatus for drawing sheet-glass, a receptacle containing molten glass, means drawing glass therefrom in sheet form in a longitudinal direction, means simultaneously drawing glass from said receptacle and stretching the sheet in a lateral direction, and devices whereby said last-named means may be operated at variable speeds.

36. In an apparatus for drawing sheet-glass, a receptacle containing molten glass, means drawing glass therefrom in sheet form, two surfaces simultaneously drawing glass from said receptacle to form the lateral portions of the sheet and stretching said sheet, and means for cooling the sheet as drawn.

In testimony whereof I have signed this specification in the presence of two subscribing witnesses.

IRVING W. COLBURN.

Witnesses:
THOMAS MCGOUGH,
J. W. ROWLAND.